J. Q. CLARKE.
CORN DRIER.
APPLICATION FILED NOV. 30, 1914.
1,155,889.
Patented Oct. 5, 1915.
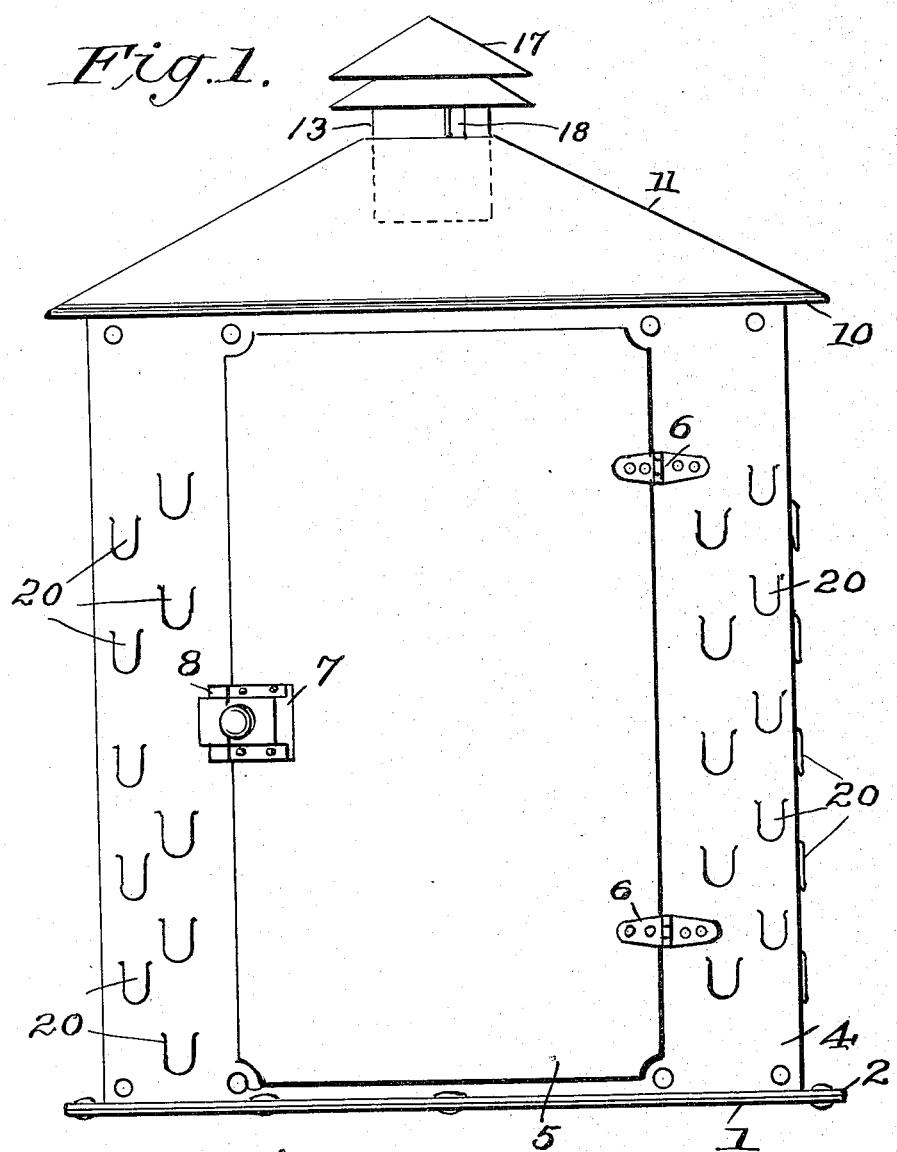
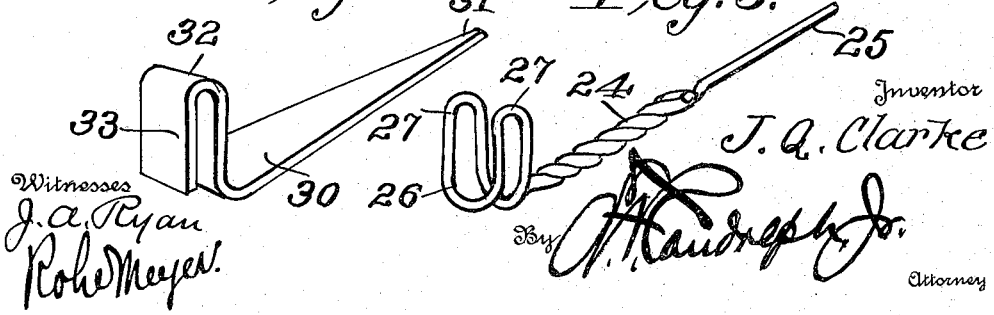

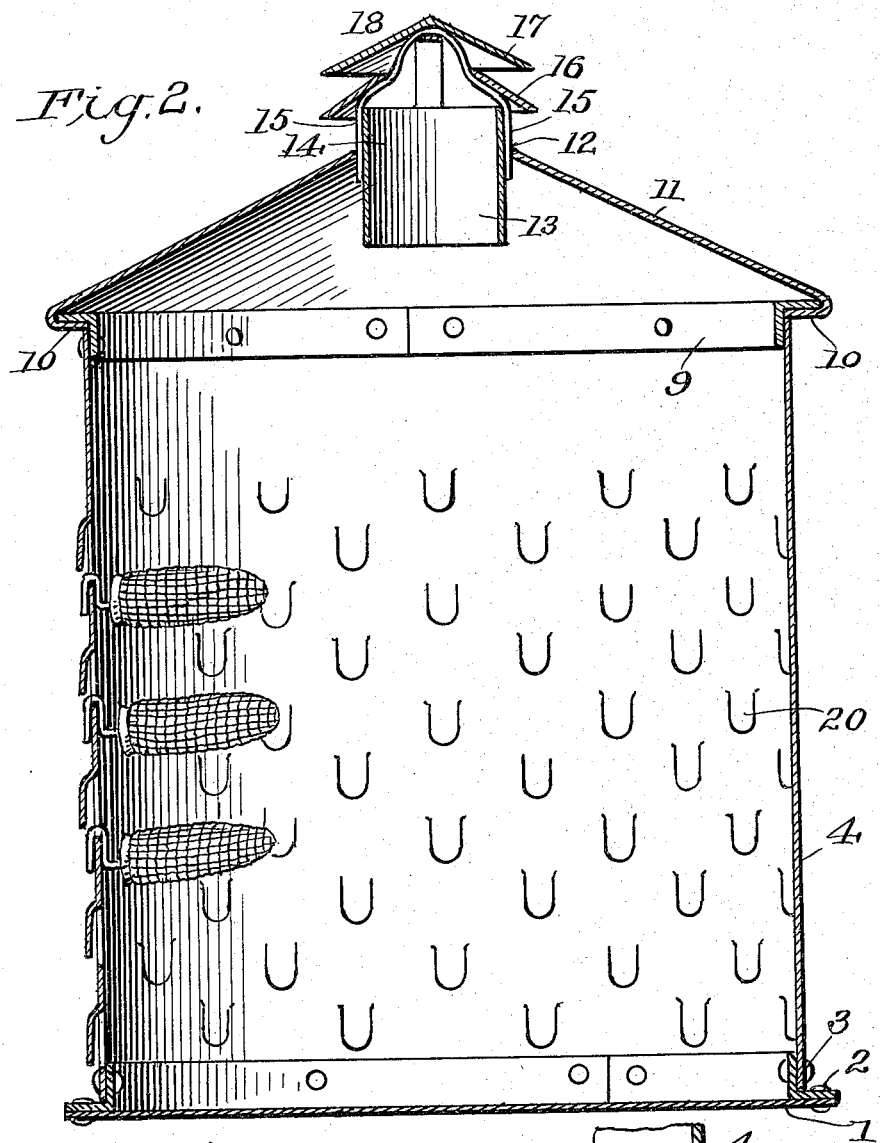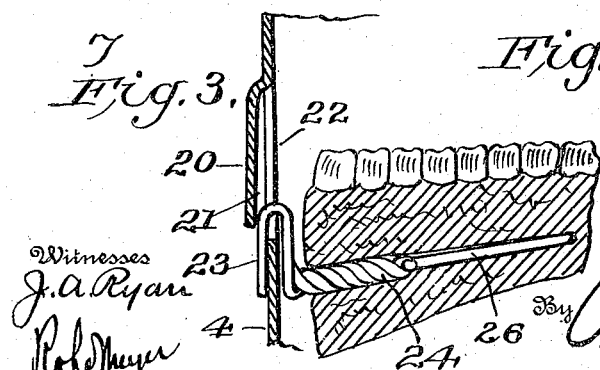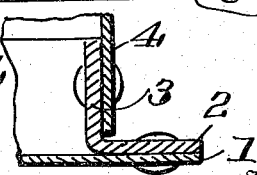

UNITED STATES PATENT OFFICE.

JOHN Q. CLARKE, OF CRAWFORDSVILLE, INDIANA.

CORN-DRIER.

1,155,889.  Specification of Letters Patent.  Patented Oct. 5, 1915.

Application filed November 30, 1914. Serial No. 874,767.

*To all whom it may concern:*

Be it known that I, JOHN Q. CLARKE, a citizen of the United States, residing at Crawfordsville, in the county of Montgomery and State of Indiana, have invented certain new and useful Improvements in Corn-Driers; and I do hereby declare the following to be a full, clear, and exact description of the invention, such as will enable others skilled in the art to which it appertains to make and use the same.

This invention relates to a device for drying seed corn and an object of the invention is to provide a drier constructed of sheet metal which is substantially cylindrical in shape so as to permit of the suspending of a maximum amount of corn in a minimum space.

Another object of this invention is to form a plurality of tongues and force these tongues outwardly from the contour of the sides of the drier so as to provide shoulders for attaching the ears of corn to the sides of the drier and to permit air to circulate through the openings, engaging the butt of an ear of corn upon entering the drier, for efficiently drying this section of an ear of corn as well as the point of the ear.

Another object of this invention is to provide a novel form of ventilator for connection to the apex of the roof of the ventilator to insure the proper circulation of air therein for the efficient drying of the seed corn.

A still further object of this invention is to provide a novel form of peg hooks for insertion into the butt end of corn and through the openings in the sides of the drier for supporting the corn transversely within the drier.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the corn drier. Fig. 2 is a central vertical section through the corn drier. Fig. 3 is a fragmentary sectional view through the corn drier, showing one of the peg hooks for suspending an ear of corn therein. Fig. 4 is a fragmentary sectional view showing the manner of connecting the side of the corn drier to the base thereof. Fig. 5 is a detail perspective view of a peg hook for suspending the corn, and Fig. 6 is a detail perspective view of a modified form of the peg hook.

Referring more particularly to the drawings, 1 designates the base of the corn drier which is circular in plan and has a plurality of angle irons 2 secured to the upper surface about the marginal edge thereof. The upwardly or vertical arms 3 of the angle iron 2 have a sheet of metal 4 secured thereto, and extending upwardly therefrom. The sheet of metal 4 forms the sides of the corn drier and is substantially cylindrical in shape, having a section cut therefrom. The section which is cut from the sheet 4 of metal is provided for permitting access to the interior of the corn drier. The side 4 of the corn drier has a door 5 hingedly connected thereto by hinges 6, which hinged door is provided for forming a closure for the opening formed by the cutting away of the section of the sheet metal. An ordinary catch structure 7 is secured to the door 5 and coacts with a keeper 8 which is secured to the side formed by the sheet of metal 4.

The upper edge of the sheet 4 is secured to a plurality of angle bars 9. The horizontal arms 10 of the angle bar or bars 9 has secured thereto the lower edge of a substantially conical shaped roof 11, which roof is also formed of sheet metal and is secured to the arms 10 in any suitable manner such as by soldering or riveting.

The apex of the substantially conical roof 11 is cut away to provide an opening 12 through which the cylindrical sleeve 13 of a ventilator 14 is inserted.

The cylindrical sleeve 13 of the ventilator structure 14 has a plurality of brackets 15 secured to the outer surface thereof, which extend upwardly from the upper end of the sleeve and have secured thereto cowl 16 and 17. The bracket arms 15 converge as they extend upwardly and are secured to the inner surface of apex of the cowl 17. The cowl 16 has its apex cut away as is clearly shown at 18 so as to permit of the circulation of air through the central portion of the cowl 16 and about the under surface of the cowl 17.

The side of the corn drier which is constructed of the sheet 4 has a plurality of tongues 20 cut therefrom and spaced in rows circumferentially about and vertically along the side, the tongues in one row being disposed staggeredly with the tongues in the row next thereto as is clearly shown by reference to the drawing. The tongues 20 are struck out from the outer surface of the side bore and have their lower ends arcuate. By striking out tongues 20, a space 21 is left between the inner surface of the tongue and the outer surface of the plate 4 which permits the insertion through the openings 22 which are formed by the cutting out of the tongue 20 of the hook ends 23 of the peg hook 24.

The peg hooks 24 are constructed of a strand of wire which has one end coiled about a portion of the length of wire for securely connecting the two ends. The outer free end 25 of the wire provides an inserting point for insertion into the cob 26 of an ear of corn, at the butt of the ear. The length of wire of which the peg hooks 24 are formed is bent intermediate its ends to form an enlarged hook shaped end 26 which composes a pair of loops 27 disposed in alinement with each other and forming a hook for engagement with the side 4 adjacent the lower end of the opening 22 for suspending an ear of corn horizontally within the interior of the drier as is clearly shown in Fig. 2 of the drawing. The striking out of the tongues 20 will permit air to enter the interior of the drier through the openings 22, and the air entering the drier through these openings will engage the butts of the ears of corn which are supported therein and efficiently dry this section of the ear practically uniformly with the drying of the remainder of the ear. In Fig. 6 of the drawings, a modified form of the peg hook is shown, which peg hook 30 is constructed of a piece of sheet metal having its side edges converging and terminating in a point 31 which is provided for insertion into the butt end of the cob or ear of corn. The plate 30 is bent upwardly transversely to the pointed end 31 and downwardly as is shown at 32 in Fig. 6 of the drawing, providing an enlarged hook end 33 for engagement with the side 4 of the corn drier for supporting ears of corn therein. In attaching or suspending the ears of corn within the drier, the outer sections of the hooks 26 and 33 of the respective segments 24 and 30 will engage the outer surface of the side 4 as is clearly shown in Fig. 3 of the drawings, securely and rigidly supporting the ears of corn within the drier.

The side 4 being constructed of sheet metal, the tongues 20 which are outset therefrom will have a certain amount of spring or elastic action, and they will resiliently grip the enlarged hook ends of the peg hooks when they are inserted through the openings 21 and prevent accidental displacement of the peg hooks and the ears of corn supported thereby.

The tongues 20 are formed in the seat 4, so they will extend downwardly, and form a protection or protective covering for the openings 21 formed by the cutting or striking out of the tongues, thus preventing rain or snow from entering the corn drier through the openings 21.

From the foregoing description taken in connection with the accompanying drawings it will be apparent that a corn drier wherein the corn will be protected from mice, rats, other rodents or fowls has been provided, and owing to the fact that the drier is constructed of sheet metal, it will attract the heat of the sun's rays, and efficiently dry the corn in a shorter length of time than would be the case if the drier was constructed of material less susceptible to heat rays.

In reducing the invention to practice certain minor features of construction, combination and arrangement of parts may necessitate alterations to which the patentee is entitled provided such alterations are comprehended within the scope of what is claimed.

What is claimed is:—

1. In a corn drier structure, a circular base, a plurality of angle irons secured to the upper surface of the marginal edges of said base, a piece of metal secured to said angle iron and projecting vertically from said base, a plurality of angle irons secured to the upper edge of said vertically extending plate, and a substantially conical shaped roof secured to said last named angle iron.

2. In a corn drier structure, a supporting base, a cylindrical wall secured to said base and projecting vertically therefrom, a plurality of tongues cut from said vertical wall and struck out from the outer contour thereof, corn supporting peg-hooks for attachment to said vertical wall for supporting ears of corn inwardly of said tongues.

3. The combination with a corn drier embodying a supporting base, a cylindrical wall secured to said base and projecting vertically therefrom, said wall being provided with a plurality of openings formed and spaced circumferentially and vertically therein, of a plurality of peg-hooks having enlarged hook ends formed thereon, said hook ends adapted for insertion through said openings and engagement with the vertical wall adjacent said opening for suspending said peg-hooks horizontally within the interior of said drier.

4. In a corn drier structure, a supporting base, a cylindrical wall secured to said base and projecting vertically therefrom, said wall being provided with a door opening formed therein, a door hingedly connected to said wall and forming a closure for said door opening, a plurality of tongues cut from said wall and struck out from the outer contour thereof, corn supporting peg hooks for attachment to said vertical wall for supporting ears of corn inwardly of said tongues.

5. In a corn drier structure, a supporting base, a vertical wall constructed of a sheet of metal secured to said base, said wall having a plurality of tongues cut therefrom in circumferential and vertical rows, the tongues in each row being disposed staggeredly with respect to the tongue in the row next thereto, and a plurality of peg-hooks for insertion through the openings formed by the striking out of said tongues for supporting ears of corn horizontally within said corn drier adjacent to the openings formed by the striking out of said tongues.

6. In a corn drier structure, the combination of a supporting base, a piece of resilient metal secured to said base and extending vertically upwardly therefrom, said upwardly extending resilient sheet of metal having a plurality of tongues struck out therefrom and forming openings through the sheet of metal, a plurality of peg-hooks for fragmentary insertion through said openings and engagement with said plate, said tongue resiliently engaging said peg-hooks and preventing accidental displacement thereof.

In testimony whereof I affix my signature in presence of two witnesses.

JOHN Q. CLARKE.

Witnesses:
 ICELONE POWELL,
 MATT S. SIMMS.

Copies of this patent may be obtained for five cents each, by addressing the "Commissioner of Patents. Washington, D. C."